United States Patent Office 3,205,164
Patented Sept. 7, 1965

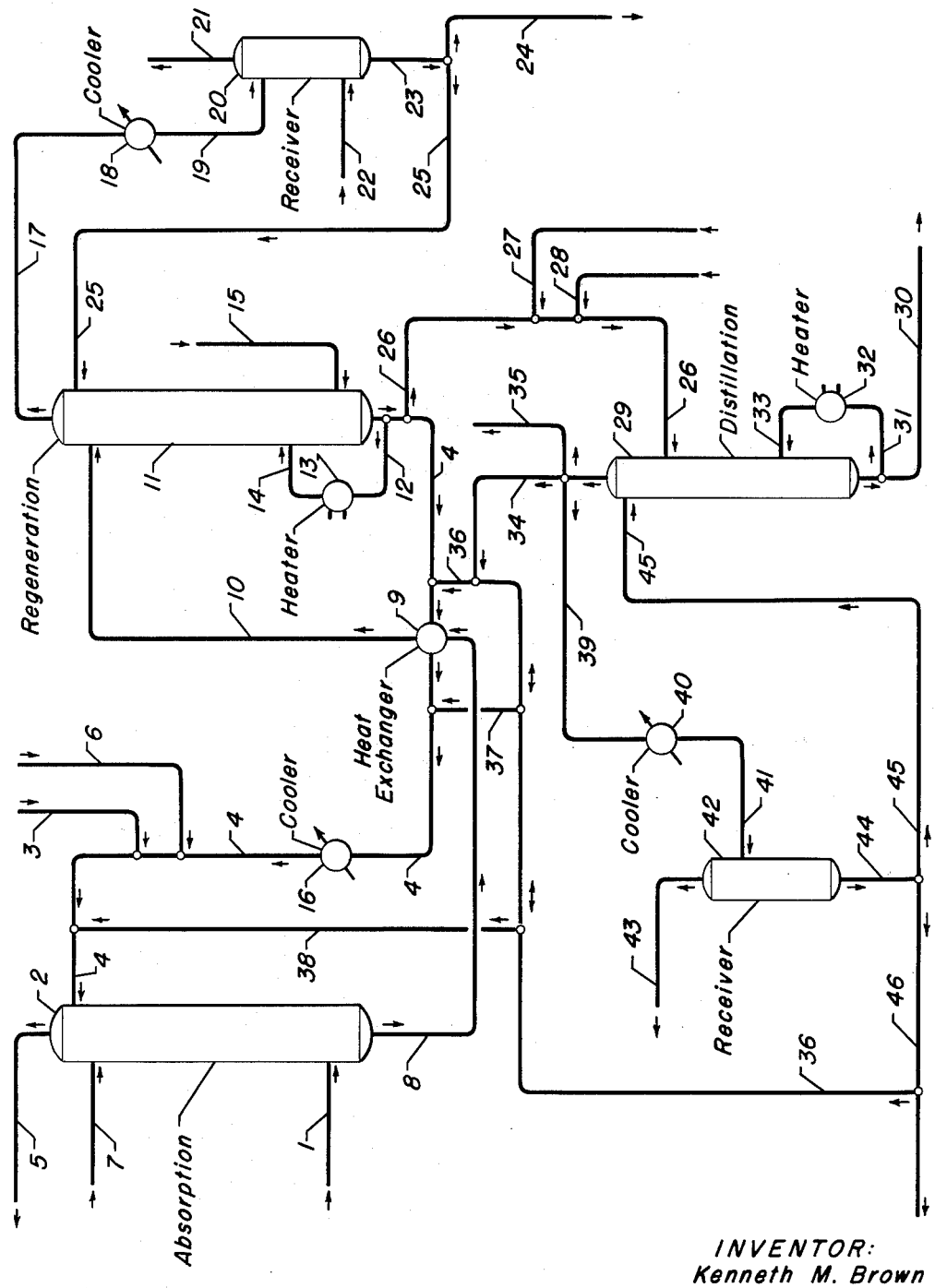

3,205,164
HYDROGEN SULFIDE REMOVAL
Kenneth M. Brown, Arlington Heights, Ill., assignor to Universal Oil Products Company, Des Plaines, Ill., a corporation of Delaware
Filed Sept. 24, 1962, Ser. No. 225,594
9 Claims. (Cl. 208—236)

This application relates to the removal of hydrogen sulfide from hydrocarbon fractions containing the same and more particularly to an improvement in the process for removing hydrogen sulfide by reaction and adsorption in an alkanolamine.

Hydrocarbon oils and gases normally contain sulfur in various forms as an impurity. For example, natural gas generally contains hydrogen sulfide. Heavier oils contain various forms of sulfur, some of which is converted into hydrogen sulfide during heating, processing and fractionating of the oil to produce selected fractions and the hydrogen sulfide is recovered in admixture with the lighter fractions of the hydrocarbon oil. The detrimental effects of hydrogen sulfide are well known and steps are taken to remove the hydrogen sulfide from the hydrocarbon fraction.

One method of removing hydrogen sulfide from normally gaseous hydrocarbon fractions or from light normally liquid hydrocarbon fractions or mixtures thereof is to treat the hydrocarbon fraction with an alkanolamine. This treating step is generally referred to in the industry as absorption or extraction. It is generally believed, however, that a salt is formed between the alkanolamine and the hydrogen sulfide, which salt is soluble in the alkanolamine solution. The alkanolamine solution and the hydrocarbon fraction are mutually insoluble and each is separately withdrawn from the absorption zone. The withdrawn hydrocarbon fraction is reduced in hydrogen sulfide and the separately withdrawn alkanolamine solution contains the hydrogen sulfide presumably in the form of a salt.

While the alkanolamine process removes a major quantity of the hydrogen sulfide from the hydrocarbon fraction, varying amounts of hydrogen sulfide are not removed in normal operation. Obviously, it is of advantage to effect substantially complete removal of the hydrogen sulfide from the hydrocarbon fraction and this is accomplished in the novel method of the present invention.

In one embodiment the present invention relates to an improvement in a process for the removal of hydrogen sulfide from a hydrocarbon fraction containing hydrogen sulfide, in which process said hydrocarbon fraction is passed into an absorption zone to contact an alkanolamine solution passed into said absorption zone at a point downstream from the introduction of said hydrocarbon fraction, which comprises adding a phthalocyanine catalyst to said absorption zone and introducing an oxygen-containing gas into said absorption zone at a point between the introduction of said hydrocarbon fraction and said alkanolamine solution.

The invention is explained further with reference to the accompanying diagrammatic flow drawing which illustrates several specific embodiments of the improved process of the present invention.

Referring to the drawing, the hydrocarbon fraction containing hydrogen sulfide is introduced into the process through line 1. As hereinbefore set forth, the hydrocarbon fraction may comprise a normally gaseous hydrocarbon fraction, including methane, ethane, propane, and/or butane or a normally liquid hydrocarbon fraction which generally will have an initial boiling point of from about 60° F. to about 120° F. and an end boiling point of from about 150° F. to about 300° F. or a mixture of normally gaseous and normally liquid fractions. It is understood that these boiling points are not critical and that the present process is used for any hydrocarbon fraction containing hydrogen sulfide. The hydrocarbon fraction may be derived from any suitable source and includes, for example, natural gas, gases separated from straight run gasoline, gases produced by thermal cracking, gases produced by catalytic cracking, gases produced by cracking in the presence of hydrogen, gases produced and/or separated during the reforming of gasoline, particularly in the presence of a catalyst and hydrogen, gases formed in a synthesis process, etc. When a hydrogen-hydrocarbon fraction contains hydrogen sulfide, the hydrogen sulfide is removed from the hydrogen-hydrocarbon mixture in accordance with the present invention. While the present invention is particularly applicable to the treatment of hydrocarbon fractions containing hydrogen sulfide, it is understood that the process also is used to treat other fractions containing hydrogen sulfide as, for example, a hydrogen fraction containing hydrogen sulfide which is formed during the steam cracking of methane or in any other manner, a nitrogen fraction containing hydrogen sulfide, etc.

The hydrocarbon fraction introduced through line 1 is passed into absorption zone 2. In the case here illustrated, absorption zone 2 is a vertical column and the hydrocarbon fraction is introduced into the lower portion thereof. While only one absorption zone is illustrated in the drawing, it is understood that two or more vertical absorption zones may be employed. Also, it is understood that the absorption zone may comprise a horizontal vessel, generally a series of two or more absorption vessels, in which the hydrocarbon fraction is introduced at one end or into one vessel and passed countercurrently to an alkanolamine solution introduced at the other end or into another horizontal vessel. In other words, when a series of horizontal vessels are employed, the hydrocarbon fraction containing hydrogen sulfide and the alkanolamine solution are introduced into different vessels and passed through each of the vessels in countercurrent flow.

In zone 2 the hydrocarbon fraction containing hydrogen sulfide is passed upwardly in countercurrent contact with a descending stream of alkanolamine solution introduced into the process through line 3 and passed by way of line 4 into zone 2. Any suitable alkanolamine is used in accordance with the present invention and generally comprises monoethanolamine, diethanolamine, triethanolamine or mixtures thereof. It is understood that the corresponding propanolamines, butanolamines, etc. may be used in accordance with the present invention. In a preferred embodiment the alkanolamine is used as an aqueous solution. The aqueous solution generally contains the alkanolamine in a concentration of from about 10% to about 30% by weight, although lower or higher concentrations may be used. It is understood that the present invention also is used with other regenerable alkaline solutions including, for example, tripotassium phosphate, trisodium phosphate, etc.

In absorption zone 2, the hydrogen sulfide is believed to react with the alkanolamine to form a salt which is soluble in the alkanolamine solution and passes downwardly through zone 2 to be removed from the lower portion thereof. The hydrocarbon fraction, now reduced in hydrogen sulfide, is withdrawn from the upper portion of absorption zone 2 through line 5. However, as hereinbefore set forth, complete removal of hydrogen sulfide normally is not effected and the hydrocarbon fraction being withdrawn through line 5 normally contains hydrogen sulfide. In accordance with the present invention, a phthalocyanine catalyst is introduced into the upper portion of zone 2 and air also is introduced into the upper portion of zone 2 but at a point below the introduction of the phthalocyanine catalyst. While the phthalocyanine catalyst may be introduced directly into the upper portion of zone 2, conveniently the phthalocyanine catalyst is introduced through line 6 to commingle with the alkanolamine solution being recycled to zone 2. Air is introduced into the upper portion of zone 2 by way of line 7.

Hydrogen sulfide which has not been removed from the hydrocarbon fraction at the point of introduction of the air, now will be oxidized by the air in the presence of the phthalocyanine catalyst to form a thiosulfate. The alkanolamine thiosulfate is soluble in the alkanolamine solution and will pass downwardly in absorption zone 2 and thus be removed from the hydrocarbon fraction passing upwardly in zone 2. In this manner, substantially complete removal of hydrogen sulfide from the hydrocarbon fraction is accomplished.

Air generally is used as the oxygen-containing gas introduced through line 7, although oxygen or any other suitable oxygen-containing gas may be used. The amount of air introduced through line 7 will depend upon the concentration of hydrogen sulfide remaining in the upper portion of absorption zone 2. The air should be introduced in a sufficient concentration to oxidize all of the hydrogen sulfide. In some cases, the hydrocarbon fraction may contain mercaptans and such mercaptans would be oxidized to disulfides. In such cases, the amount of air is sufficient to oxidize all of the hydrogen sulfide remaining in the hydrocarbon fraction and, if desired, to oxidize all or a portion of the mercaptans. The hydrocarbon fraction withdrawn through line 5 will contain excess air, if any, and also will contain disulfides formed by oxidation of mercaptans, if any.

Any suitable phthalocyanine catalyst is used in accordance with the present invention and preferably comprises a metal phthalocyanine catalyst. Particularly preferred metal phthalocyanines include cobalt phthalocyanine and vanadium phthalocyanine. Other metal phthalocyanines include iron phthalocyanine, copper phthalocyanine, nickel phthalocyanine, chromium phthalocyanine, etc. The metal phthalocyanines, in general, are not readily soluble in aqueous solvents and, therefore, a derivative of the phthalocyanine is preferred. A particularly preferred derivative is the sulfonated derivative. Thus, an especially preferred phthalocyanine catalyst is cobalt phthalocyanine sulfonate. Such a catalyst comprises cobalt phthalocyanine disulfonate and also contains cobalt phthalocyanine monosulfonate. Another preferred catalyst comprises vanadium phthalocyanine sulfonate. These compounds may be obtained from any source or prepared in any suitable manner as, for example, by reacting cobalt or vanadium phthalocyanine with 25–50% fuming sulfuric acid. While the sulfonic acid derivatives are preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction the acid chloride is formed and may be converted to the desired carboxylated derivative by conventional hydrolysis.

An aqueous solution of the phthalocyanine catalyst preferably is used in the present invention. A particularly preferred embodiment is to form a solution of the phthalocyanine catalyst in the alkanolamine. In another embodiment a solution of the phthalocyanine catalyst and ammonium hydroxide is used. The phthalocyanine catalyst is very active and, therefore, generally is used in a comparatively small concentration which usually will be below about 1% by weight of the alkanolamine solution and usually will be within the range of from about 5 to 500 parts per million based upon the alkanolamine solution.

Absorption zone 2 is operated at a mild temperature which may range from atmospheric to about 200° F. or more and generally from about 80° F. to about 125° F. Superatmospheric pressure preferably is employed in order to maintain the system in substantially liquid phase and thus the pressure may range from 25 pounds to 1000 pounds or more and particularly will be within the range of from about 75 to about 500 pounds per square inch. It is understood that absorption zone 2 may contain suitable contacting means including bubble trays, bubble decks, side to side pans, perforated plates, etc. and/or suitable packing material including raschig rings, carbon particles, etc. Also, it is understood that the hydrocarbon fraction, alkanolamine solution and/or air may be introduced into absorption zone 2 through suitable distributing devices not illustrated.

As hereinbefore set forth, the alkanolamine solution passing downwardly through absorption zone 2 will contain the hydrogen sulfide, presumably in the form of a salt. The alkanolamine solution passing downwardly in zone 2 also will contain the phthalocyanine catalyst. The alkanolamine solution is withdrawn from the lower portion of zone 2 through line 8 and is subjected to regeneration to release the hydrogen sulfide and to recover alkanolamine for reuse in the process. In the case here illustrated, the alkanolamine is passed through line 8 into and through heat exchanger 9 and through line 10 to regenerator 11. In heat exchanger 9, the alkanolamine solution is heated by indirect contact with the regenerated alkanolamine solution being recycled within the process in the manner to be hereinafter described.

As hereinbefore set forth, the alkanolamine-hydrogen sulfide salt is decomposed by heating to release hydrogen sulfide and to recover alkanolamine for reuse in the process. In the case here illustrated, heating of the alkanolamine is accomplished by passing a portion of the regenerated alkanolamine from line 4 through line 12 into heater 13. Heater 13 comprises a reboiler in which the alkanolamine is passed in indirect heat exchange with a heating medium. Any suitable heating medium may be employed including, for example, steam, hot oil, etc. The heated alkanolamine then is returned from heater 13 by way of line 14 back to regenerator 11. In place of the reboiler illustrated, it is understood that internal heating coils or an external gas fired furnace may be used to provide the desired heating.

The temperature employed in the lower portion of regenerator 11 will depend upon the particular alkanolamine being used and generally will be within the range of from about 200° F. to about 350° F. Usually the pressure employed in regenerator 11 will be less than about 100 pounds per square inch and, more particularly, from about atmospheric to about 50 pounds per square inch. Regeneration zone 11 also may contain suitable contacting means including bubble trays, bubble decks, side to side pans, perforated plates, etc. and/or packing material including raschig rings, carbon particles, etc.

As hereinbefore set forth, heating of the alkanolamine-hydrogen sulfide salt in the manner hereinbefore described serves to decompose the salt and to separate hydrogen sulfide from regenerated alkanolamine. Because water vapor may be liberated and removed from the upper portion of zone 11, make-up water is required, and the make-up water may be introduced by way of line 15 into the lower portion of zone 11 or it may be commingled with the regenerated alkanolamine solution in any other suitable manner. The regenerated alkanolamine solution is passed by way of line 4 through heat exchanger 9 and preferably is further cooled by indirect heat exchange in cooler 16 and then returned by way of line 4 to absorption zone 2. Any suitable cooling means may be employed in cooler 16 and conveniently comprises water at about atmospheric temperature.

The hydrogen sulfide and other volatile material separated in regenerator 11 are removed from the upper portion thereof through line 17, cooled in cooler 18 and passed by way of line 19 into receiver 20. Hydrogen sulfide is withdrawn from receiver 20 by way of line 21. When desired, all or a portion of the make-up water may be introduced into the lower portion of receiver 20 by way of line 22. In one embodiment, all of the make-up water required to form the desired alkanolamine solution is introduced by way of line 15 or by way of line 20 and, in another embodiment, a portion of the make-up water is introduced through both of these lines. It is understood that the make-up water may be introduced in any other suitable manner. The liquid condensed in receiver 20 is withdrawn therefrom by way of line 23 and, while all or a portion may be removed from the process through line 24, preferably at least a portion thereof is recycled by way of line 25 to the upper portion of regeneration zone 11 to serve as a cooling and refluxing medium therein and to supply water to the regenerated alkanolamine solution.

As hereinbefore set forth, the regenerated alkanolamine solution contains thiosulfate formed by oxidation of the hydrogen sulfide. In order to avoid a build-up of thiosulfate in the regenerated alkanolamine solution, a slip stream of the regenerated alkanolamine solution is withdrawn from line 4 by way of line 26. While all or a portion of the slip stream may be discarded from the process by way of line 27, preferably at least a portion is subjected to further treatment to recover the alkanolamine. This is accomplished, in one embodiment, by commingling an alkali metal hydroxide, preferably sodium hydroxide or potassium hydroxide, with the slip stream and thereby form the alkali metal thiosulfate salt. It is understood that other alkali reagents may be used including, for example, sodium carbonate, potassium carbonate, etc. The alkali metal hydroxide is introduced by way of line 28 into line 26 and the mixture then is passed into distillation zone 29. The alkali metal hydroxide preferably is supplied in at least an equimolar amount to the thiosulfate ion present in the slip stream.

In distillation zone 29, alkanolamine is separated from the alkali metal thiosulfate salt. Heat for the distillation is furnished in any suitable manner. In the case illustrated, a portion of the alkali metal thiosulfate salt being withdrawn from the bottom of zone 29 by way of line 30 is passed through line 31, heater 32 and returned by way of line 33 to zone 29. Here again, any suitable heat exchange medium may be used in heater 32 and conveniently comprises hot oil, steam, etc. The remaining alkali metal thiosulfate is withdrawn from the process by way of line 30 and may be discarded or used as desired. It is understood that distillation zone 29 may contain suitable contacting means including bubble trays, bubble decks, side to side pans, perforated plates, etc. and/or packing material including raschig rings, carbon particles, etc.

The alkanolamine separated in distillation zone 29 is removed from the upper portion thereof by way of line 34 and, while all or a portion thereof may be removed from the process by way of line 35, preferably at least a portion thereof is returned for further use in the absorption zone. In one embodiment this may be accomplished by passing the alkanolamine through line 34 and line 36 to commingle with the regenerated alkanolamine solution in line 4 before passing into heat exchanger 9, or it may be passed by way of lines 36 and 37 to commingle with the regenerated alkanolamine solution after heat exchanger 9, or it may be passed by way of line 36 and line 38 to commingle with the regenerated alkanolamine solution in line 4 after cooler 16. Preferably, however, the alkanolamine solution withdrawn from the upper portion of distillation zone 29 is passed by way of lines 34 and 39, cooled in cooler 40 and passed through line 41 into receiver 42. Vent line 43 is provided to withdraw components uncondensed in receiver 42. The condensate in receiver 42 is withdrawn therefrom through line 44 and a portion thereof is recycled by way of line 45 to the upper portion of zone 29 to serve as a cooling and refluxing medium therein. While all or a portion of the alkanolamine withdrawn from receiver 42 may be removed from the process through line 46, preferably at least a portion thereof is recycled by way of line 36 for further use in absorption zone 2. This may be accomplished in the manner as hereinbefore described in that the alkanolamine may be passed into line 4 through line 36, line 37 and/or line 38.

In the interest of simplicity, pumps, valves, additional heaters or coolers, etc. have been omitted from the drawing, with the understanding that these will be provided as required.

From the above description, it will be seen that the present invention provides a novel improvement in a process for removing hydrogen sulfide from hydrocarbon fractions, the improvement resulting in a hydrocarbon fraction substantially free from hydrogen sulfide. As hereinbefore set forth, in normal extraction of hydrogen sulfide from hydrocarbon fractions, complete removal of the hydrogen sulfide is not obtained. The present invention provides a novel method for obtaining substantially complete removal of hydrogen sulfide.

The following examples are introduced to illustrate further the novelty and utility of the present invention but not with the intention of unduly limiting the same.

*Example I*

A propane-butane mixture contains 2.0% by weight of hydrogen sulfide. In a conventional diethanolamine extraction process, the propane-butane fraction is passed countercurrently to an aqueous diethanolamine solution containing 15% by weight of diethanolamine. The extraction is effected at a temperature of 100° F. and a pressure of 200 pounds per square inch. The treated propane-butane fraction contains about 0.05% by weight of hydrogen sulfide.

*Example II*

In a process similar to that described in Example I, cobalt phthalocyanine disulfonate catalyst, in a concentration of 25 parts per million, is commingled with the diethanolamine solution being recycled to the upper portion of the absorption zone. Air is introduced into the absorption zone at a point near the upper portion thereof but below the point of introduction of the recycled diethanolamine solution and phthalocyanine catalyst. In this operation the propane-butane feed being withdrawn from the upper portion of the absorption zone will be substantially free of hydrogen sulfide.

*Example III*

In an operation similar to that described in Example II, the diethanolamine solution is subjected to regeneration at a temperature of about 250° F. and a pressure of about 20 pounds per square inch. The regenerated diethanolamine solution is withdrawn from the lower portion of the regeneration zone and is recycled to the absorber for further use therein. A slip stream, comprising about 2% by volume of the regenerated diethanolamine solution is withdrawn, sodium hydroxide is commingled therewith in an equimolar amount to the thiosulfate ion present therein, and the mixture is subjected to distillation to separate the ethanolamine for reuse in the absorption zone. The sodium thiosulfate salt formed in the distillation zone is withdrawn as a bottom product.

*Example IV*

The hydrocarbon fraction of this example is an overhead liquid from a stabilizer and contains hydrogen sulfide. The hydrocarbon fraction comprises pentane and lighter hydrocarbons. This fraction is subjected to countercurrent extraction with ethanolamine in a vertical absorption zone at 90° F. and 140 pounds per square inch. The rich ethanolamine solution is subjected to regeneration in a separate zone at a temperature of 240° F. and a pressure of 10 pounds per square inch. The regenerated ethanolamine solution is recycled to the upper portion of the absorption zone. Vanadium phthalocyanine disulfonate catalyst is commingled with the recycled ethanolamine solution in a concentration of 50 parts per million. Air is introduced into the upper portion of the absorption zone at a point below the introduction of the recycled ethanolamine solution containing the phthalocyanine catalyst. The hydrocarbon fraction being withdrawn from the upper portion of the absorption zone is substantially free of hydrogen sulfide.

I claim as my invention:

1. In a process for the removal of hydrogen sulfide from a hydrocarbon fraction containing hydrogen sulfide wherein said fraction is passed into an absorption zone to contact an alkaline solution passed into said absorption zone at a point downstream from the introduction of said hydrocarbon fraction, the improvement which comprises adding a phthalocyanine catalyst to said absorption zone and introducing an oxygen-containing gas into said absorption zone at a point between the introduction of said hydrocarbon fraction and said alkaline solution, the process being further characterized in that the bulk of the hydrogen sulfide is removed from said hydrocarbon fraction during initial contact of the latter with said solution and in that the remainder of the hydrogen sulfide is removed by the subsequent treatment of said fraction in the presence of said catalyst and oxygen.

2. The process of claim 1 wherein said alkaline solution containing hydrogen sulfide is subjected to regeneration to remove hydrogen sulfide from the alkaline solution and the regenerated alkaline solution is recycled, at least in part, to said absorption zone.

3. In a process for the removal of hydrogen sulfide from a hydrocarbon fraction containing hydrogen sulfide wherein said hydrocarbon fraction is passed into an absorption zone to contact an alkanolamine solution passed into said absorption zone at a point downstream from the introduction of said hydrocarbon fraction, the improvement which comprises adding a phthalocyanine catalyst to said absorption zone and introducing an oxygen-containing gas into said absorption zone at a point between the introduction of said hydrocarbon fraction and said alkanolamine solution, the process being further characterized in that the bulk of the hydrogen sulfide is removed from said hydrocarbon fraction during initial contact of the latter with said solution and in that the remainder of the hydrogen sulfide is removed by the subsequent treatment of said fraction in the presence of said catalyst and oxygen.

4. In a process for the removal of hydrogen sulfide from a hydrocarbon fraction containing hydrogen sulfide wherein said hydrocarbon fraction is introduced into a lower portion of a vertical absorption zone and passed in countercurrent contact with an alkanolamine solution introduced into an upper portion of said absorption zone, the improvement which comprises commingling a phthalocyanine catalyst with said alkanolamine solution and introducing air into said absorption zone at a point between the introduction of said hydrocarbon fraction and said alkanolamine solution, the process being further characterized in that the bulk of the hydrogen sulfide is removed from said hydrocarbon fraction during initial contact of the latter with said solution and in that the remainder of the hydrogen sulfide is removed by the subsequent treatment of said fraction in the presence of said catalyst and oxygen.

5. The process of claim 4 wherein an alkanolamine solution containing hydrogen sulfide is subjected to regeneration to remove hydrogen sulfide from alkanolamine solution and the regenerated alkanolamine solution is recycled, at least in part, to said absorption zone, the further improvement comprising withdrawing a slip stream of said regenerated alkanolamine solution, commingling an alkali metal hydroxide therewith and subjecting said mixture to distillation to separate alkanolamine solution from alkali metal salt.

6. In a process for the removal of hydrogen sulfide from a hydrocarbon fraction containing hydrogen sulfide wherein said hydrocarbon fraction is passed upwardly in a vertical absorption zone to contact a downwardly descending stream of an ethanolamine solution, ethanolamine solution containing hydrogen sulfide is subjected to regeneration and the regenerated ethanolamine solution is recycled, at least in part, to said absorption zone, the improvement which comprises commingling a metal phthalocyanine sulfonate catalyst with said regenerated ethanolamine solution being recycled to said absorption zone and introducing air into an upper portion of said absorption zone between the introduction of said hydrocarbon and said recycled ethanolamine solution, the process being further characterized in that the bulk of the hydrogen sulfide is removed from said hydrocarbon fractions during initial contact of the latter with said solution and in that the remainder of the hydrogen sulfide is removed by the subsequent treatment of said fraction in the presence of said catalyst and oxygen.

7. The process of claim 6 wherein said ethanolamine solution is an aqueous ethanolamine solution.

8. The process of claim 6 wherein said ethanolamine solution is an aqueous diethanolamine solution.

9. The process of claim 6 wherein a slip stream of said regenerated ethanolamine solution is commingled with sodium hydroxide and subjected to distillation to separate ethanolamine from sodium salt.

References Cited by the Examiner

UNITED STATES PATENTS

| | | | |
|---|---|---|---|
| 2,114,852 | 4/38 | McKittrick | 208—240 |
| 2,281,356 | 4/52 | Johnstone et al. | 208—237 |
| 2,921,020 | 1/60 | Urban et al. | 208—206 |
| 2,966,453 | 12/60 | Gleim et al. | 208—206 |

ALPHONSO D. SULLIVAN, *Primary Examiner.*